M. B. FISCHER.
CIRCUIT CLOSER FOR SIGNALS FOR AUTOMOBILES.
APPLICATION FILED JAN. 24, 1918.
1,296,276.
Patented Mar. 4, 1919.
2 SHEETS—SHEET 1.
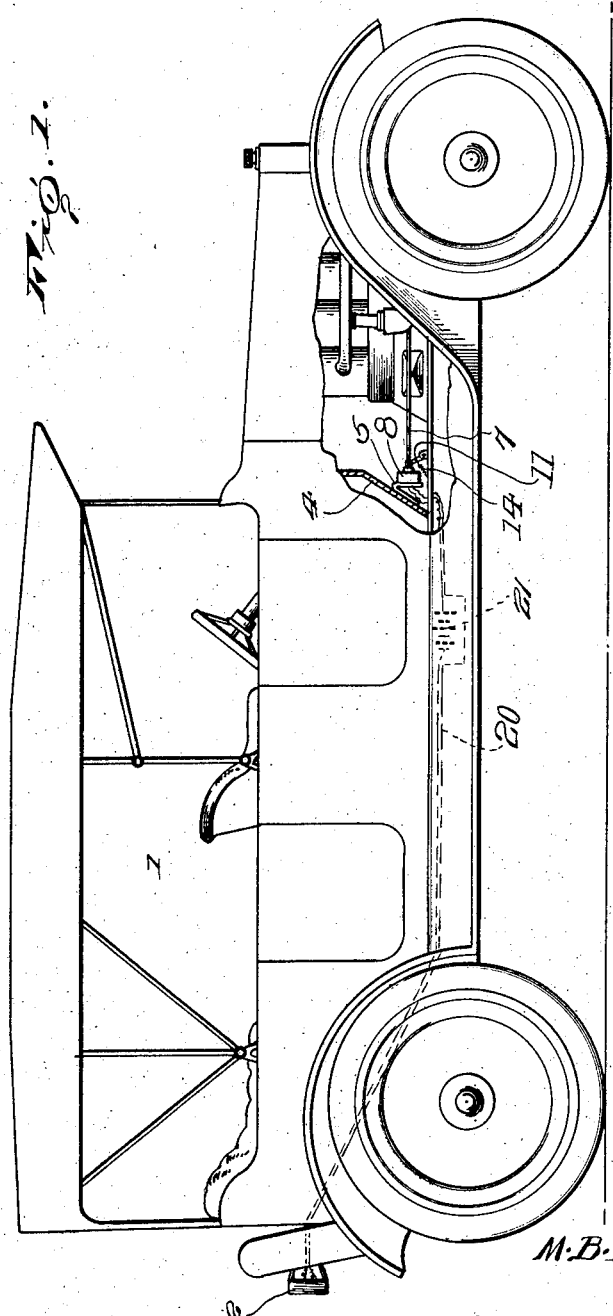

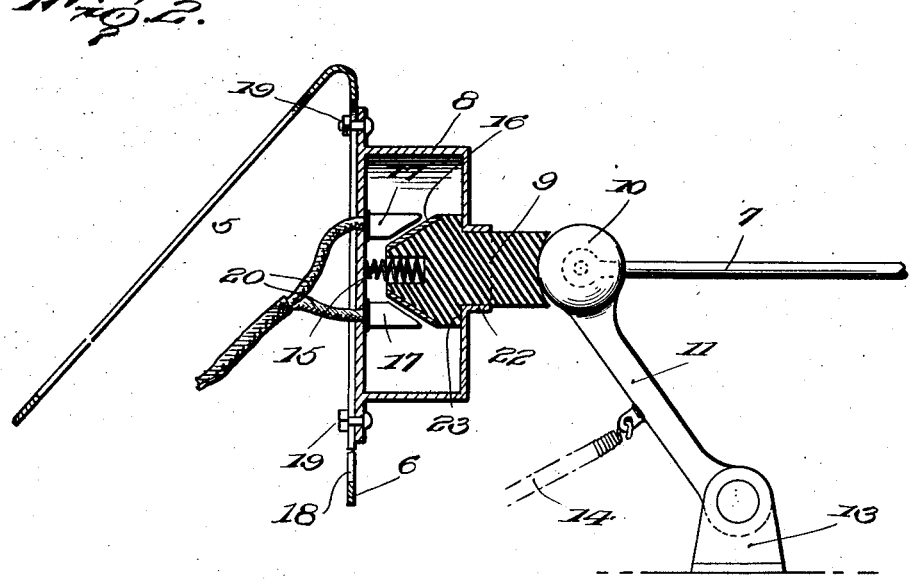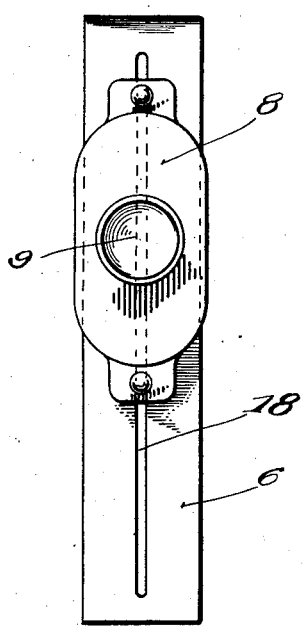

UNITED STATES PATENT OFFICE.

MORITZ B. FISCHER, OF CHICAGO, ILLINOIS.

CIRCUIT-CLOSER FOR SIGNALS FOR AUTOMOBILES.

1,296,276.   Specification of Letters Patent.   Patented Mar. 4, 1919.

Application filed January 24, 1918.   Serial No. 213,598.

*To all whom it may concern:*

Be it known that I, MORITZ B. FISCHER, a citizen of the United States, residing at Chicago, in the county of Cook and State of Illinois, have invented certain new and useful Improvements in Circuit-Closers for Signals for Automobiles, of which the following is a specification.

My invention relates to signals for automobiles and has for its object the provision of a simple and efficient mechanism for use at night or in dark places whereby, when the vehicle is slowed down or about to stop, notification of that fact will be given at the rear of the vehicle so that the occupants of following machines may avoid collision. The invention is illustrated in the accompanying drawings and consists in certain novel features which will be first fully described and then particularly pointed out in the appended claims.

In the drawings—

Figure 1 is a side elevation of an automobile with parts broken away and showing the application of my invention;

Fig. 2 is an enlarged detail sectional elevation of the circuit-closing mechanism;

Fig. 3 is a front elevation of the circuit-closing device.

The automobile 1 may be of any conventional or preferred type. In applying my invention thereto I provide a casing 2 at the rear end of the vehicle so that when a lamp located within the casing is lighted a warning on the rear side of the casing may be easily read. At any convenient point upon the frame of the automobile, preferably to the front side of the dash, I secure a bracket 5 which has an arm 6 disposed adjacent the accelerator or fuel-controlling rod 7. Upon the front side of this arm 6, I secure a box or other holder or support 8 having a button 9 slidably mounted in its front side, as shown clearly in Fig. 2. The outer or forward end of this button is concave or socketed so as to be engaged by the globular enlargement 10 at the upper end of a lever 11 which is pivotally attached to the fuel controlling rod 7, as clearly shown. The lever is fulcrumed at its lower end upon a suitable post 13 secured upon the automobile frame and a spring 14, secured to the lever and to the frame of the vehicle, tends to hold the lever in its rearward position so that when the chauffeur releases the accelerator the fuel controlling rod will be moved rearwardly, the supply of fuel reduced and the machine will slow down. The button 9 is formed of some non-conductive material, and a spring 15, interposed between the rear end of the button and the rear wall of the holder 8, serves to maintain the button in its foremost position at all times. The inner end of the button 9 is preferably tapered and is provided with a covering or shell 16 of some conducting material which is adapted to bear upon the contacts 17 when the button is in its rearward position with its tapered end between said contacts. The arm 6 of the bracket 5 is preferably constructed with a longitudinal slot 18 which receives securing bolts or pins 19 at the upper and lower ends of the holder 8 so that the said holder and the button 9 may be adjusted vertically to accommodate variations in the dimensions of automobiles and thereby permit the device to be readily applied to any machine. The contacts 17 form terminals of conductors 20 which lead to opposite sides of the lamp located within the casing 2 and a battery, indicated at 21, is interposed in one of said conductors.

The operation will be readily understood from what has been said. Normally the button 9 is out of engagement with the contacts 17 so that the lamp will not be lighted and the signal will be dark. When the chauffeur moves the throttle or the accelerator so as to reduce the supply of fuel and permit the speed of the machine to be lowered, the fuel controlling rod moves rearwardly and the lever 11 connected therewith will also move rearwardly under the influence of the spring 14. The button 9 will thereupon be at once pushed rearwardly into engagement with the contacts 17 so that the circuit will be closed and the lamp lighted. When the machine is again speeded up, the spring 15 moves the button 9 forwardly so that it will follow the movement of the fuel controlling rod and the lever, and the circuit will then be broken. The particular form of the push button 9 is immaterial but, as shown in the drawings, I prefer to provide a collar 22 upon the holder 8 and provide the button with an annular shoulder 23 which by impinging against the front wall of the holder 8 will prevent the button being projected therefrom. The inner opposed faces of the terminal contacts are beveled to correspond with the tapered end of the push button so that the push button may readily enter between the terminals and make a good contact therewith, notwithstanding that the contacting surfaces may become worn through use. The device is exceedingly simple in the construction and arrangement of its parts and may be applied to any automobile at a very slight cost. When applied, it will be entirely automatic and highly efficient in its operation.

Having thus described my invention, what is claimed as new is:

1. In a device for the purpose set forth, the combination of electric conductors, spaced forwardly projecting terminals for said conductors, a push button slidable longitudinally and adapted at its rear end to enter between and engage said terminals, a spring bearing upon the said rear end of the button and holding the button normally out of engagement with the terminals, a lever fulcrumed at its lower end and having its upper end secured to the fuel-controlling member of an engine and bearing upon the front end of the push button in opposition to said spring, and a spring connected with said lever to retract the same and thereby move the push button into engagement with the terminals.

2. An apparatus for the purpose set forth comprising a holder to be secured to the dash of an automobile, a pair of forwardly projecting terminals mounted upon the rear wall of said holder, a longitudinally slidable push button mounted in the front wall of the holder and having a tapered inner end to engage between said terminals, the forward outer end of the button being socketed, a conductor secured around the rear tapered end of the push button to electrically connect the terminals, a spring interposed between the rear end of the push button and the holder to hold the push button normally out of engagement with the terminals, and a lever having one end connected with the fuel-controlling member of an engine and fitting in the socketed front end of the button to move the button into engagement with the terminals.

3. In a device for the purpose set forth, the combination of a bracket adapted to be secured to the dash of an automobile, a holder adjustably secured on said bracket, a collar on the front side of the holder, spaced forwardly projecting terminals carried by the rear side of the holder, a push button slidably mounted in the collar on the front side of the holder and having its rear end arranged to enter between and engage said terminals, a spring fitted between the rear end of the push button and the rear side of the holder to hold the push button normally out of engagement with the terminals, a lever connected with the fuel-controlling member of an engine and bearing upon the forward end of the push button, and a spring connected with said lever to force the push button into engagement with the terminals.

In testimony whereof I affix my signature.

MORITZ B. FISCHER. [L. S.]